United States Patent
Gonzalez Escudero

(10) Patent No.: US 11,956,739 B2
(45) Date of Patent: Apr. 9, 2024

(54) METHODS PROVIDING SYSTEM FRAME NUMBER OFFSET OVER APPLICATION PROTOCOL INTERFACE AND RELATED NETWORKS AND NETWORK NODES

(71) Applicant: Telefonaktiebolaget LM Ericsson (publ), Stockholm (SE)

(72) Inventor: Alberto Gonzalez Escudero, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 364 days.

(21) Appl. No.: 17/612,697

(22) PCT Filed: May 29, 2019

(86) PCT No.: PCT/IB2019/054435
§ 371 (c)(1),
(2) Date: Nov. 19, 2021

(87) PCT Pub. No.: WO2020/240253
PCT Pub. Date: Dec. 3, 2020

(65) Prior Publication Data
US 2022/0248350 A1   Aug. 4, 2022

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0053* (2013.01); *H04W 76/15* (2018.02); *H04W 92/20* (2013.01)

(58) Field of Classification Search
CPC ........... H04W 56/001; H04W 72/0446; H04W 72/0453; H04L 5/0051; H04L 25/0226;
(Continued)

(56) References Cited

U.S. PATENT DOCUMENTS

2003/0117997 A1   6/2003   Kim
2004/0008646 A1   1/2004   Park et al.
(Continued)

FOREIGN PATENT DOCUMENTS

EP   3291616 A1   3/2018

OTHER PUBLICATIONS

International Search Report and Written Opinion dated Feb. 13, 2020 for International Application No. PCT/IB2019/054435 filed May 29, 2019, consisting of 11-pages.
(Continued)

*Primary Examiner* — Kyaw Z Soe
(74) *Attorney, Agent, or Firm* — Christopher & Weisberg, P.A.

(57) ABSTRACT

A method of operating a network node may be provided. A message may be sent from a first portion of the network node for configuring a time difference between an absolute time reference in the network node and a system frame offset for a served cell of the network node. An acknowledgement message from a second portion of the network node may acknowledge inclusion of the time difference in cell configuration data for the served cell. A further method of operating a network node may be provided. A message may be sent form the network node to a neighboring network node providing a time difference between a network time reference and a system frame offset for a cell in. An acknowledgement message may be received from the neighboring network node acknowledging inclusion of the time difference in cell configuration data for the served cell.

20 Claims, 26 Drawing Sheets

(51) Int. Cl.
*H04W 76/15* (2018.01)
*H04W 92/20* (2009.01)

(58) Field of Classification Search
CPC . H04L 27/2602; H04L 27/261; H04L 5/0048; H04L 25/0202
See application file for complete search history.

(56) References Cited

U.S. PATENT DOCUMENTS

| | | | |
|---|---|---|---|
| 2009/0168750 A1 | 7/2009 | Pelletier et al. | |
| 2018/0302202 A1* | 10/2018 | Kim | H04L 5/0048 |
| 2021/0320766 A1* | 10/2021 | Li | H04L 5/0048 |
| 2022/0070922 A1* | 3/2022 | Talarico | H04W 74/0808 |

OTHER PUBLICATIONS

3GPP TS 38.331 V15.4.0; 3rd Generation Partnership Project; Technical Specification Group Radio Access Network; NR; Radio Resource Control (RRC) protocol specification (Release 15); Dec. 2018, consisting of 475-pages.

3GPP TS 38.401 V15.4.0; 3rd Generation Partnership Project; Technical Specification Group Radio Access Network; NG-RAN; Architecture description (Release 15); Dec. 2018, consisting of 40-pages.

3GPP TS 38.473 V15.4.1; 3rd Generation Partnership Project; Technical Specification Group Radio Access Network; NG-RAN; F1 application protocol (F1AP) (Release 15); Jan. 2019, consisting of 192-pages.

3GPP TS 38.133 V15.4.0; 3rd Generation Partnership Project; Technical Specification Group Radio Access Network; NR; Requirements for support of radio resource management (Release 15); Dec. 2018, consisting of 876-pages.

3GPP TS 38.423 V15.2.0; 3rd Generation Partnership Project; Technical Specification Group Radio Access Network; NG-RAN; Xn application protocol (XnAP) (Release 15); Dec. 2018, consisting of 281-pages.

3GPP TS 36.423 V15.4.0; 3rd Generation Partnership Project; Technical Specification Group Radio Access Network; Evolved Universal Terrestrial Radio Access Network (E-UTRAN); X2 application protocol (X2AP) (Release 15); Dec. 2018, consisting of 408-pages.

3GPP TS 28.541 V15.1.0; 3rd Generation Partnership Project; Technical Specification Group Services and System Aspects; Management and orchestration; 5G Network Resource Model (NRM); Stage 2 and stage 3 (Release 15); Dec. 2018, consisting of 232-pages.

3GPP TS 36.133 V15.5.0; 3rd Generation Partnership Project; Technical Specification Group Radio Access Network; Evolved Universal Terrestrial Radio Access (E-UTRA); Requirements for support of radio resource management (Release 15); Dec. 2018, consisting of 3563-pages.

* cited by examiner

| Gap Pattern Id | Measurement Gap Length (MGL, ms) | Measurement Gap Repetition Period (MGRP, ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

Figure 2

SSB-MTC information element

```
-- ASN1START
-- TAG-SSB-MTC-START

SSB-MTC ::=                    SEQUENCE {
    periodicityAndOffset           CHOICE {
        sf5                            INTEGER (0..4),
        sf10                           INTEGER (0..9),
        sf20                           INTEGER (0..19),
        sf40                           INTEGER (0..39),
        sf80                           INTEGER (0..79),
        sf160                          INTEGER (0..159)
    },
    duration                       ENUMERATED { sf1, sf2, sf3, sf4, sf5 }
}

SSB-MTC2 ::=                   SEQUENCE {
    pci-List                       SEQUENCE (SIZE (1..maxNrofPCIsPerSMTC)) OF PhysCellId
OPTIONAL,  -- Need N
    periodicity                    ENUMERATED {sf5, sf10, sf20, sf40, sf80, spare3,
spare2, spare1}
}

-- TAG-SSB-MTC-STOP
-- ASN1STOP
```

Figure 3

| SSB-MTC field descriptions |
|---|
| duration |
| Duration of the measurement window in which to receive SS/PBCH blocks. It is given in number of subframes (see TS 38.213 [13], clause 4.1). |
| periodicityAndOffset |
| Periodicity and offset of the measurement window in which to receive SS/PBCH blocks. Periodicity and offset are given in number of subframes. |
| FFS_FIXME: This does not match the L1 parameter table! They seem to intend an index to a hidden table in L1 specs. (see TS 38.213 [13], clause REF). |
| Periodicity for the given PCIs. Timing offset and Duration as provided in smtc1. |

Figure 4

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-DU ID | M | | 9.3.1.9 | | YES | reject |
| gNB-DU Name | O | | PrintableString(SIZE(1..150,...)) | | YES | ignore |
| gNB-DU Served Cells List | | 0..1 | | List of cells configured in the gNB-DU | YES | reject |
| >gNB-DU Served Cells Item | | 1..<maxCellingNBDU> | | | EACH | reject |
| >>Served Cell Information | M | | 9.3.1.10 | Information about the cells configured in the gNB-DU | – | |
| >>gNB-DU System Information | O | | 9.3.1.18 | RRC container with system information owned by gNB-DU | – | |
| gNB-DU RRC version | M | | RRC version 9.3.1.70 | | YES | reject |

| Range bound | Explanation |
|---|---|
| maxCellingNBDU | Maximum no. cells that can be served by a gNB-DU. Value is 512. |

Figure 5

| IE/Group Name | Presence | Range | IE type and reference | Semantics description |
|---|---|---|---|---|
| MIB message | M | | OCTET STRING | MIB message, as defined in TS 38.331 [8]. |
| SIB1 message | M | | OCTET STRING | SIB1 message, as defined in TS 38.331 [8]. |

Figure 6

| IE/Group Name | Presence | Range | IE type and reference | Semantics description | Criticality | Assigned Criticality |
|---|---|---|---|---|---|---|
| NR CGI | M | | 9.3.1.12 | | - | |
| NR PCI | M | | INTEGER (0..1007) | Physical Cell ID | - | |
| 5GS TAC | O | | 9.3.1.29 | 5GS Tracking Area Code | - | |
| Configured EPS TAC | O | | 9.3.1.29a | | - | |
| Served PLMNs | | 1..<maxnoofBPLMNs> | | Broadcast PLMNs | - | |
| >PLMN Identity | M | | 9.3.1.14 | | - | |
| >TAI Slice Support List | O | | Slice Support List 9.3.1.37 | Supported S-NSSAIs per TA | YES | Ignore |
| CHOICE NR-Mode-Info | M | | | | - | |
| >FDD | | | | | | |
| >>FDD Info | | 1 | | | - | |
| >>>UL NR FreqInfo | M | | NR Frequency Info 9.3.1.17 | | - | |
| >>>DL FreqInfo | M | | NR Frequency Info 9.3.1.17 | | - | |
| >>>UL Transmission Bandwidth | M | | Transmission Bandwidth 9.3.1.15 | | - | |
| >>>DL Transmission Bandwidth | M | | Transmission Bandwidth 9.3.1.15 | | - | |
| >TDD | | | | | - | |
| >>TDD Info | | 1 | | | - | |
| >>> NR FreqInfo | M | | NR Frequency Info 9.3.1.17 | | - | |
| >>> Transmission Bandwidth | M | | Transmission Bandwidth 9.3.1.15 | | - | |
| Measurement Timing Configuration | M | | OCTET STRING | Contains the MeasurementTimingConfiguration inter-node message defined in TS 38.331 [8] | - | |
| RANAC | O | | RAN Area Code 9.3.1.57 | | YES | Ignore |
| Extended Served PLMNs List | | 0..1 | | This is included if more than 6 Served PLMNs is to be signalled | YES | Ignore |
| >Extended Served PLMNs Item | | 1..<maxnoofExtendedBPLMNs> | | | - | |
| >>PLMN Identity | M | | 9.3.1.14 | | - | |
| >>TAI Slice Support List | O | | Slice Support List 9.3.1.37 | Supported S-NSSAIs per TA | - | |

MeasGapConfig information element

```
-- ASN1START
-- TAG-MEAS-GAP-CONFIG-START

MeasGapConfig ::=            SEQUENCE {
    gapFR2                       SetupRelease { GapConfig }
OPTIONAL,     -- Need M
    ...,
    [[
    gapFR1                       SetupRelease { GapConfig }
OPTIONAL,     -- Need M
    gapUE                        SetupRelease { GapConfig }
OPTIONAL      -- Need M
    ]]
}

GapConfig ::=                SEQUENCE {
    gapOffset                    INTEGER (0..159),
    mgl                          ENUMERATED {ms1dot5, ms3, ms3dot5, ms4, ms5dot5, ms6},
    mgrp                         ENUMERATED {ms20, ms40, ms80, ms160},
    mgta                         ENUMERATED {ms0, ms0dot25, ms0dot5},
    ...
}

-- TAG-MEAS-GAP-CONFIG-STOP
-- ASN1STOP
```

Figure 12

| Gap Pattern Id | MeasurementGap Length (MGL, ms) | Measurement Gap Repetition Period (MGRP, ms) | Minimum available time for inter-frequency and inter-RAT measurements during 480ms period (Tinterf, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x, inter-RAT NR |
| 1 | 6 | 80 | 30 | Inter-Frequency E-UTRAN FDD and TDD, UTRAN FDD, GERAN, LCR TDD, HRPD, CDMA2000 1x, inter-RAT NR |
| 2 | 3 | 40 | 24[NOTE 1,2] | Inter-Frequency E-UTRAN FDD and TDD for cells with time difference as specified below. inter-RAT NR |
| 3 | 3 | 80 | 12[NOTE 1,2] | Inter-Frequency E-UTRAN FDD and TDD for cells with time difference according as specified below. inter-RAT NR |

Figure 13

| IE/Group Name | Presence | Range | IE type and reference | Semantics description | Criticality | Assigned Criticality |
|---|---|---|---|---|---|---|
| NR CGI | M | | 9.3.1.12 | | - | |
| NR PCI | M | | INTEGER (0..1007) | Physical Cell ID | - | |
| 5GS TAC | O | | 9.3.1.29 | 5GS Tracking Area Code | - | |
| Configured EPS TAC | O | | 9.3.1.29a | | - | |
| Served PLMNs | | 1..<maxnoofBPLMNs> | | Broadcast PLMNs | - | |
| >PLMN Identity | M | | 9.3.1.14 | | - | |
| >TAI Slice Support List | O | | Slice Support List 9.3.1.37 | Supported S-NSSAIs per TA. | YES | ignore |
| CHOICE NR-Mode-Info | M | | | | - | |
| >FDD | | | | | - | |
| >>FDD Info | | 1 | | | - | |
| >>>UL FreqInfo | M | | NR Frequency Info 9.3.1.17 | | - | |
| >>>DL FreqInfo | M | | NR Frequency Info 9.3.1.17 | | - | |
| >>>UL Transmission Bandwidth | M | | Transmission Bandwidth 9.3.1.15 | | - | |
| >>>DL Transmission Bandwidth | M | | Transmission Bandwidth 9.3.1.15 | | - | |

Figure 15A

| >TDD | | | | | | |
|---|---|---|---|---|---|---|
| >>TDD Info | | 1 | | | | |
| >>> NR FreqInfo | M | | NR Frequency Info 9.3.1.17 | | | |
| >>> Transmissi on Bandwidth | M | | Transmissi on Bandwidth 9.3.1.15 | | | |
| Measureme nt Timing Configurati on | M | | OCTET STRING | Contains the MeasurementTimingConfigur ation inter-node message defined in TS 36.331 [8]. | | |
| >>SFN offset | O | | | SFN offset for the cell relative to a network time reference. | | |
| RANAC | O | | RAN Area Code 9.3.1.57 | | YES | ignore |
| Extended Served PLMNs List | | 0..1 | | This is included if more than 6 Served PLMNs is to be signalled. | YES | ignore |
| >Extended Served PLMNs Item | | 1..<maxnoofExtendedBPL MNs> | | | | |
| >>PLMN Identity | M | | 9.3.1.14 | | | |
| >>TAI Slice Support List | O | | Slice Support List 9.3.1.37 | Supported S-NSSAIs per TA. | | |

Figure 15B

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-DU ID | M | | 9.3.1.9 | | YES | reject |
| gNB-DU Name | O | | PrintableString(SIZE(1..150,...)) | | YES | ignore |
| gNB-DU Served Cells List | | 0..1 | | List of cells configured in the gNB-DU | YES | reject |
| >gNB-DU Served Cells Item | | 1..<maxCellingNBDU> | | | EACH | reject |
| >>Served Cell Information | M | | 9.3.1.10 | Information about the cells configured in the gNB-DU | – | |
| >>gNB-DU System Information | O | | 9.3.1.18 | RRC container with system information owned by gNB-DU | – | |
| >>SFN offset | O | | | SFN offset for the cell relative to a network time reference. | – | |
| gNB-DU RRC version | M | | RRC version 9.3.1.70 | | YES | reject |

| Range bound | Explanation |
|---|---|
| maxCellingNBDU | Maximum no. cells that can be served by a gNB-DU. Value is 512. |

Figure 18

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Served Cells To Add List | | 0..1 | | Complete list of added cells served by the gNB-DU | YES | reject |
| >Served Cells To Add Item | | 1..<maxCellingNBDU> | | | EACH | reject |
| >>Served Cell Information | M | | 9.3.1.10 | Information about the cells configured in the gNB-DU | - | |
| >>gNB-DU System Information | O | | 9.3.1.18 | RRC container with system information owned by gNB-DU | - | |
| >>SFN offset | O | | | SFN offset for the cell relative to a network time reference. | - | |
| Served Cells To Modify List | | 0..1 | | Complete list of modified cells served by the gNB-DU | YES | reject |
| >Served Cells To Modify Item | | 1..<maxCellingNBDU> | | | EACH | reject |
| >>Old NR CGI | M | | NR CGI 9.3.1.12 | | - | |
| >>Served Cell Information | M | | 9.3.1.10 | Information about the cells configured in the gNB-DU | - | |
| >>gNB-DU System Information | O | | 9.3.1.18 | RRC container with system information owned by gNB-DU | - | |
| >>SFN offset | O | | | SFN offset for the cell relative to a network time reference. | - | |
| Served Cells To Delete List | | 0..1 | | Complete list of deleted cells served by the gNB-DU | YES | reject |

Figure 19A

| | | | | | | |
|---|---|---|---|---|---|---|
| >Served Cells To Delete Item | | 1..<br><maxCellingNBDU> | | | EACH | reject |
| >>Old NR CGI | M | | NR CGI 9.3.1.12 | | | |
| Cells Status List | | 0..1 | | Complete list of active cells | YES | reject |
| > Cells Status Item | | 0..<br><maxCellingNBDU> | | | EACH | reject |
| >> NR CGI | M | | 9.3.1.12 | | | |
| >>Service Status | M | | 9.3.1.66 | | | |
| Dedicated SI Delivery Needed UE List | | 0..1 | | List of UEs unable to receive system information from broadcast | YES | ignore |
| > Dedicated SI Delivery Needed UE Item | | 1..<br><maxnoofUEIDs> | | | EACH | ignore |
| >>gNB-CU UE F1AP ID | M | | 9.3.1.4 | | | |
| >>NR CGI | M | | 9.3.1.12 | | | |

| Range bound | Explanation |
|---|---|
| maxCellingNBDU | Maximum no. cells that can be served by a gNB-DU. Value is 512. |
| maxnoofUEIDs | Maximum no. of UEs that can be served by a gNB-DU. Value is 65536. |

Figure 19B

| IE/Group Name | Presence | Range | IE type and reference | Semantics description | Criticality | Assigned Criticality |
|---|---|---|---|---|---|---|
| NR-PCI | M | | INTEGER (0..1007) | NR Physical Cell ID | -- | -- |
| Cell ID | M | | NR CGI 9.2.111 | | -- | -- |
| 5GS TAC | O | | OCTET STRING (3) | Broadcast 5GS Tracking Area Code | -- | -- |
| Configured TAC | O | | OCTET STRING (2) | This is the TAC configured in the en-gNB, different from the 5GS TAC broadcast in the NR cell and enables application of Roaming and Access Restrictions for EN-DC as specified in TS 37.340 [32] | -- | -- |
| Served PLMNs | | 1..<maxnoofBPLMNs> | | Broadcast PLMNs | -- | -- |
| >PLMN Identity | M | | 9.2.4 | | -- | -- |
| CHOICE NR-Mode-Info | M | | | | -- | -- |
| >FDD | | | | | | |
| >>FDD Info | | 1 | | | -- | -- |
| >>>UL FreqInfo | M | | NR Frequency Info 9.2.106 | | -- | -- |
| >>>DL FreqInfo | M | | NR Frequency Info 9.2.106 | | -- | -- |
| >>>UL Transmission Bandwidth | M | | NR Transmission Bandwidth 9.2.114 | | -- | -- |
| >>>DL Transmission Bandwidth | M | | NR Transmission Bandwidth 9.2.114 | | -- | -- |
| >TDD | | | | | | |
| >>TDD Info | | 1 | | | -- | -- |
| >>>NR FreqInfo | M | | NR Frequency Info 9.2.106 | | -- | -- |
| >>>Transmission Bandwidth | M | | NR Transmission Bandwidth 9.2.114 | | -- | -- |
| Measurement Timing Configuration | M | | OCTET STRING | Contains the MeasurementTimingConfiguration inter-node message for the served cell, as defined in TS 38.331 [31] | -- | -- |
| >>SFN offset | O | | | SFN offset for the cell relative to a network time reference. | -- | -- |

Figure 20

| IE/Group Name | Presence | Range | IE type and reference | Semantics description | Criticality | Assigned Criticality |
|---|---|---|---|---|---|---|
| NR Neighbour Information | | 1 .. <maxnoofNRNeighbours> | | | -- | |
| >NR Neighbour Information | | | | | | |
| >>NRPCI | M | | INTEGER (0..1007) | NR Physical Cell ID | -- | |
| >>NR-CGI | M | | 9.2.111 | | -- | |
| >>CHOICE NR-Neighbour-Mode-Info | M | | | | -- | -- |
| >>>FDD | | | | | | |
| >>>>FDD Info | | 1 | | | -- | -- |
| >>>>>UL ARFCNFreqInfo | M | | NR ARFCN Frequency Info 9.2.106 | | -- | -- |
| >>>>>DL ARFCNFreqInfo | M | | NR ARFCN Frequency Info 9.2.106 | | -- | -- |
| >>>TDD | | | | | | |
| >>>>TDD Info | | 1 | | | -- | -- |
| >>>>>ARFCNNRFreqInfo | M | | NR ARFCN Frequency Info 9.2.106 | | -- | -- |
| >>5GS-TAC | O | | OCTET STRING (3) | Broadcast 5GS Tracking Area Code | -- | |
| >>Configured TAC | O | | OCTET STRING (2) | This is the TAC configured in the en-gNB, different from the 5GS TAC broadcast in the NR cell and enables application of Roaming and Access Restrictions for EN-DC as specified in TS 37.340 [32] | -- | |
| >>Measurement Timing Configuration | M | | OCTET STRING | Contains the MeasurementTimingConfiguration inter-node message for the neighbour cell, as defined in TS 38.331 [31] | -- | |
| >>SFN offset | O | | | SFN offset for the cell relative to a network time reference | -- | |

| Range bound | Explanation |
|---|---|
| maxnoofNRNeighbours | Maximum no. of neighbour NR cells associated to a given served cell. Value is 1024. |

Figure 21

| IE/Group Name | Presence | Range | IE type and reference | Semantics description | Criticality | Assigned Criticality |
|---|---|---|---|---|---|---|
| PCI | M | | INTEGER (0..503) | Physical Cell ID | – | – |
| Cell ID | M | | ECGI 9.2.14 | | – | – |
| TAC | M | | OCTET STRING(2) | Tracking Area Code | – | – |
| Broadcast PLMNs | | 1..<maxnoofBPLMNs> | | Broadcast PLMNs | – | – |
| >PLMN Identity | M | | 9.2.4 | | – | – |
| CHOICE EUTRA-Mode-Info | M | | | | – | – |
| >FDD | | | | | | |
| >>FDD Info | | | | | – | – |
| >>>UL EARFCN | M | | EARFCN 9.2.26 | Corresponds to N_UL in TS 36.104 [16] for E-UTRA operating bands for which N_UL is defined; ignored for E-UTRA operating bands for which N_UL is not defined | – | – |
| >>>DL EARFCN | M | | EARFCN 9.2.26 | Corresponds to N_DL in TS 36.104 [16] | – | – |
| >>>UL Transmission Bandwidth | M | | Transmission Bandwidth 9.2.27 | Same as DL Transmission Bandwidth in this release; ignored in case UL EARFCN value is ignored | – | – |
| >>>DL Transmission Bandwidth | M | | Transmission Bandwidth 9.2.27 | | – | – |
| >>>UL EARFCN Extension | O | | EARFCN Extension 9.2.65 | If this IE is present, the value signalled in the UL EARFCN IE is ignored | YES | reject |
| >>>DL EARFCN Extension | O | | EARFCN Extension 9.2.65 | If this IE is present, the value signalled in the DL EARFCN IE is ignored | YES | reject |
| >>>Offset of NB-IoT Channel Number to DL EARFCN | O | | Offset of NB-IoT Channel Number to EARFCN 9.2.94 | Corresponds to M_DL in TS 36.104 [16] | YES | reject |
| >>>Offset of NB-IoT Channel Number to UL EARFCN | O | | Offset of NB-IoT Channel Number to EARFCN 9.2.94 | Corresponds to M_UL in TS 36.104 [16] | YES | reject |
| >>>NRS-NSSS-PowerOffset | O | | ENUMERATED (-3, 0, 3, …) | NRS to NSSS power ratio, as defined in TS 36.213 [11] | YES | ignore |
| >>>NSSS-NumOccasionDifferentPrecoder | O | | ENUMERATED (2, 4, 8, …) | The number of consecutive NSSS occasions that use different precoders for NSSS transmission, as defined in TS 36.213 [11] | YES | ignore |
| >TDD | | | | | | |
| >>TDD Info | | | | | – | – |
| >>>EARFCN | M | | 9.2.26 | Corresponds to N_UL/N_DL in TS 36.104 [16] | – | – |

Figure 24A

| | | | | | | |
|---|---|---|---|---|---|---|
| >>>Transmission Bandwidth | M | | Transmission Bandwidth 9.2.27 | | -- | -- |
| >>>Subframe Assignment | M | | ENUMERATED(s a0, sa1, sa2, sa3, sa4, sa5, sa6,...) | Uplink-downlink subframe configuration information defined in TS 36.211 [10]. In NB-IoT, sa0 and sa6 are not applicable. | -- | -- |
| >>>Special Subframe Info | | ? | | Special subframe configuration information defined in TS 36.211 [10] | -- | -- |
| >>>>Special Subframe Patterns | M | | ENUMERATED(s ssp0, ssp1, ssp2, ssp3, ssp4, ssp5, ssp6, ssp7, ssp8, ...) | | -- | -- |
| >>>>Cyclic Prefix DL | M | | ENUMERATED(N ormal, Extended,...) | | -- | -- |
| >>>>Cyclic Prefix UL | M | | ENUMERATED(N ormal, Extended,...) | | -- | -- |
| >>>Additional Special Subframe Info | O | | | Special subframe configuration information defined in TS 36.211 [10]. Only for newly defined configuration of special subframe from Release 11. | YES | ignore |
| >>>>Additional Special Subframe Patterns | M | | ENUMERATED(s ssp0, ssp1, ssp2, ssp3, ssp4, ssp5, ssp6, ssp7, ssp8, ssp9,...) | | -- | -- |
| >>>>Cyclic Prefix DL | M | | ENUMERATED(N ormal, Extended,...) | | -- | -- |
| >>>>Cyclic Prefix UL | M | | ENUMERATED(N ormal, Extended,...) | | -- | -- |
| >>>EARFCN Extension | O | | 9.2.65 | If this IE is present, the value signaled in the EARFCN IE is ignored. | YES | reject |
| >>>Additional Special Subframe Extension Info | O | | | Special subframe configuration information defined in TS 36.211 [10]. Only for newly defined configuration of special subframe from Release 14. | YES | ignore |
| >>>>Additional Special Subframe Patterns Extension | M | | ENUMERATED(s ssp10,...) | | -- | -- |
| >>>>Cyclic Prefix DL | M | | ENUMERATED(N ormal, Extended,...) | | -- | -- |
| >>>>Cyclic Prefix UL | M | | ENUMERATED(N ormal, Extended,...) | | -- | -- |
| Number of Antenna Ports | O | | 9.2.43 | | YES | ignore |

Figure 24B

| PRACH Configuration | O | | PRACH Configuration 9.2.50 | | YES | ignore |
|---|---|---|---|---|---|---|
| MBSFN Subframe Info | | 0..<maxnoofMBSFN> | | MBSFN subframe defined in TS 36.331 [9] | GLOBAL | ignore |
| >Radioframe Allocation Period | M | | ENUMERATED(n1, n2, n4, n8, n16, n32, ...) | | – | – |
| >Radioframe Allocation Offset | M | | INTEGER (0..7, ...) | | – | – |
| >Subframe Allocation | M | | 9.2.53 | | – | – |
| CSG ID | O | | 9.2.53 | | YES | ignore |
| MBMS Service Area Identity List | | 0..<maxnoofMBMSServiceAreaIdentities> | | Supported MBMS Service Area Identities in the cell | GLOBAL | ignore |
| >MBMS Service Area Identity | | | OCTET STRING(2) | MBMS Service Area Identies as defined in TS 23.003 [28] | | |
| MultibandInfoList | O | | 9.2.58 | | YES | ignore |
| FreqBandIndicatorPriority | O | | ENUMERATED (not-broadcasted, broadcasted, ...) | This IE indicates that the eNodeB supports FreqBandIndicatorPriority, and whether FreqBandIndicatorPriority is broadcasted in SIB 1 (see TS 36.331 [9]) | YES | ignore |
| BandwidthReducedSI | O | | ENUMERATED (scheduled, ...) | This IE indicates that the SystemInformationBlockType1-BR is scheduled in the cell (see TS 36.331 [9]) | YES | ignore |
| Protected E-UTRA Resource Indication | O | | 9.2.125 | This IE indicates which E-UTRA control/reference signal resources are protected and are not subject to E-UTRA - NR Cell Resource Coordination. | YES | ignore |
| >>SFN offset | O | | | SFN offset for the cell relative to a network time reference. | – | – |

METHODS PROVIDING SYSTEM FRAME NUMBER OFFSET OVER APPLICATION PROTOCOL INTERFACE AND RELATED NETWORKS AND NETWORK NODES

CROSS-REFERENCE TO RELATED APPLICATION

This application is a Submission Under 35 U.S.C. § 371 for U.S. National Stage Patent Application of International Application Number: PCT/IB2019/054435, filed May 29, 2019 entitled "METHODS PROVIDING SYSTEM FRAME NUMBER OFFSET OVER APPLICATION PROTOCOL INTERFACE AND RELATED NETWORKS AND NETWORK NODES," the entirety of which is incorporated herein by reference.

TECHNICAL FIELD

The present disclosure relates generally to communications, and more particularly, to synchronization methods in radio access networks, and network nodes.

BACKGROUND

FIG. 1 illustrates network nodes 102, 104, and 106 in a radio access network. Network nodes 102 and 104 are each a next Generation Node B (gNB). Network node 106 is an Evolved Node B (eNB). Network nodes 102 and 104 each have an exemplary split deployment. In the split deployment, gNB 102, 104 are each divided into two units, a gNB central unit (gNB-CU) and a gNB distributed unit (gNB-DU). Each gNB-CU and gNB-DU are connected via an F1 Application Protocol (F1AP). gNB 102 and gNB 104 are connected via an Xn Application Protocol (XnAP) interface. gNB 104 and eNB 106 are connected via an X2 Application Protocol (X2AP) interface.

In new radio (NR), the synchronization signal (SSB) has a variable periodicity of 5, 10, 20, 40, 80 or 160 ms. FIG. 2 shows the measurement gaps for user equipment (UE) are defined in 3GPP TS 38.133 v15.4.0 (2018-12), Requirements for Support of Radio Resource Management. Referring to FIG. 2, no gap can be longer than 6 ms. Any periodicity longer than 5 ms, may require configuration of UE with the synchronization signal/physical broadcast channel block measurement time configuration (SMTC (SSB-MTC)) defined in 3GPP TS 38.331 v15.4.0 (2018-12), Radio Resource Control (RRC) protocol. FIG. 3 shows a synchronization signal block (SSB)-measurement time configuration (MTC) (SSB-MTC) information element from 3GPP TS 38.331 v. 15.4.0 (2018-12) for configuring measurement timing configurations, e.g., timing occasions at which a UE measures SSBs. FIG. 4 shows exemplary SSB-MTC field descriptions from 3GPP TS 38.331 v15.4.0 (2018-12) for the SSB-MTC information element shown in FIG. 3.

The SSB-MTC information element indicates to a UE where in time to find the SSB. The SSB-MTC is configured both for inter-frequency NR measurements (where the UE measures from NR to NR and needs gaps), and for Bx measurements from Long Term Evolution (LTE) to NR (e.g., to set up EUtra NR Dual Connectivity (EN-DC) or to perform mobility from LTE to NR).

As neighboring nodes require this information to configure UEs properly, this same information is sent from a gNB-DU (e.g., gNB-DU 102b) to a gNB-CU (e.g., gNB-CU 102a) over the F1AP interface; and between a gNB (e.g., gNB 104) and an eNB (e.g., eNB 106) over an X2/Xn interface (if EN-DC/New Radio-EUtra Dual Connectivity (NE-DC), the X2 interface is used when the eNB (e.g., eNB 106) is the master and the Evolved Packet Core (EPC) is used when the gNB (e.g., gNB 102) is the master and 5G Core Network (5GC) is used) or between a gNB (e.g., gNB 102) and a gNB (e.g., gNB 104) over Xn.

FIG. 5 illustrates an excerpt from 3GPP TS 38.473 v15.4.1, Section 9.2.1.4 for a F1 Setup Request over a F1AP interface. This message is sent by a gNB-DU (e.g., gNB-DU 102b) to transfer information for a transport network layer (TNL) association. The direction of the message is from a gNB-DU toward a gNB-CU. As shown in FIG. 5, both the system information and the served cell information is passed to the gNB-CU (e.g., gNB-CU 102a).

FIG. 6 illustrates a gNB-DU System Information from 3GPP TS 38.473 v15.4.1, Section 9.3.1.18. Referring to FIG. 6, the gNB-DU System information element contains system information generated by a gNB-CU (e.g., gNB-CU 102a). A Served Cell information element from 3GPP TS 38.473 v15.4.1, Section 9.3.1.10, is shown in FIG. 7. Referring to FIG. 7, the Served Cell information element contains cell configuration information of a cell in the gNB-DU (e.g., gNB-DU 102b).

A Measurement Timing Configuration message is used to convey assistance information for measurement timing. The direction of a Measurement Timing Configuration message may be from en-gNB toward a eNB, from an eNB toward a en-gNB, from a gNB toward a gNB, from a gNB-DU toward a gNB-CU, and from a gNB-CU toward a gNB-DU. FIG. 8 shows an excerpt of a Measurement Timing Configuration message, and Measurement Timing field descriptions, from 3GPP TS 38.331, v15.4.0.

3GPP TS 38.401 v.15.4.0 (2018-12), Architecture description, describes gNB synchronization and states that a configurable LTE time division duplex (TDD) offset of start frame is supported by gNBs in synchronized TDD-unicast areas in order to achieve interoperability in coexistence scenarios.

Thus, a configurable SFN offset may also be applicable to NR Cells.

FIG. 9 illustrates a successful operation of a procedure for an Xn setup from 3GPP TS 38.423, Section 8.4.1.2. FIG. 10 shows a successful operation of a procedure for an Xn configuration update from 3GPP TS 38.423, Section 8.4.2.2.

In EN-DC, as part of a cg-ConfigInfo RRC container sent from eNB to gNB as part of a Secondary gNB (SgNB) Addition Request or Reconfiguration (either from eNB or responses to reconfiguration from gNB), the eNB sends information regarding the master cell group discontinuous reception (DRX) and measurement gap configuration. FIGS. 11A-11B illustrate an exemplary cg-ConfigInfo message from 3GPP TS 38.331. This message may be used by a master eNB or gNB to request a SgNB to perform certain actions, e.g. to establish, modify or release a secondary cell group (SCG). The message may include additional information, e.g. to assist the SgNB to set a SCG configuration. It can also be used by a CU to request a DU to perform certain actions, e.g. to establish, modify or release a master cell group (MCG) or SCG. The direction of a cg-ConfigInfo message may be from a master eNB or a gNB toward a secondary gNB, or alternatively a CU toward a DU.

FIG. 12 illustrates a MeasGapConfig information element from 3GPP TS 38.331. The MeasGapConfig information element specifies the measurement gap configuration and controls setup/release of measurement gaps. The gapOffset shown in FIG. 12 is an offset which references a LTE Cell system frame number (SFN).

Additionally, in LTE, a sync signal is broadcast in subframe 0 and 5 for frequency division duplex (FDD), and subframe 1 and 6 for TDD, all in slot 0.

In release 14, a capability is introduced in LTE referred to as shortMeasurementGap-r14. The shortMeasurmentGap-r14 capability indicates whether a UE is capable of performing 3 ms gaps, instead of the 6 ms gaps. See 3GPP TS 36.133 v15.5.0 (2018-12), Evolved Universal Terrestrial Radio Access (E-Utra), Requirements for Support of Radio Resource Management. FIG. 13 illustrates Gap Pattern Configurations supported by a UE from 3GPP TS 36.133 v15.5.0 (2018-12), Table 8.1.2.1-1. This gap pattern can be configured for E-UTRA measurement when a UE supports shortMeasurementGap-r14 or can be configured for inter-RAT NR measurement only.

In current NR systems, a problem may exist where SFN offset information is not available in an Application Protocol interface setup, configuration, and/or update procedure.

SUMMARY

According to some embodiments of inventive concepts, a method performed by a network node may be provided for configuring a time difference in the network node between an absolute time reference in the network node and a system frame offset for a served cell of the network node in a radio access network. A message may be sent from a first portion of the network node to a second portion of the network node for configuring the time difference. The message may include an indicator in the message defining the time difference between the system frame offset for the served cell and the absolute time reference. An acknowledgement message may be received from the second portion of the network node acknowledging that the second portion of the network node included the time difference in cell configuration data for the served cell.

According to some other embodiments of inventive concepts, a method performed by a network node may be provided for providing to a neighboring network node in a radio access network a time difference between a network time reference and a system frame offset for a cell in a radio access network. A message may be sent from the network node to the neighboring network node providing the time difference. The message may include an indicator in the message defining the time difference between the system frame offset for the cell and the absolute time reference. An acknowledgement message may be received from the neighboring network node acknowledging that the neighboring network node included the time difference in cell configuration data for the cell.

A potential advantage that may be achieved is that by providing a time difference between a network time reference and a system frame offset for a cell in a radio access network, there may be no need to implement logic on the nodes to guess the ssbOffset error, or SFTD measurements (which measure SFN offset between LTE and NR Cell) if there is a Network Synchronization available. Additional potential advantages may be that UEs are configured with measurement(s) containing the right timing from the start, with no need for a training period for the network. Further potential advantages may be that two eNBs with different SFN offsets in their cells may use short measurement gaps without the need for additional configuration.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 2 is a table illustrating Gap Pattern Configurations as described in Table 9.1.2-1 of 3GPP TS 38.133 v.15.4.0 (2018-12);

FIG. 3 is a diagram illustrating an SSB-MTC information element as described in 3GPP TS 38.331 v.15.4.0 (2018-12);

FIG. 4 is a diagram illustrating SSB-MTC field descriptions as described in 3GPP TS 38.331 v.15.4.0 (2018-12);

FIG. 5 is a diagram illustrating an F1 Setup Request as described in 3FPP TS 38.473 v15.4.1, Section 9.2.1.4;

FIG. 6 is a diagram illustrating gNB-DU System Information as described in 3FPP TS 38.473 v15.4.1, Section 9.3.1.18;

FIG. 7 is a diagram illustrating Served Cell Information as described in 3GPP TS 38.473 v15.4.1, Section 9.3.1.10;

Figure 8:
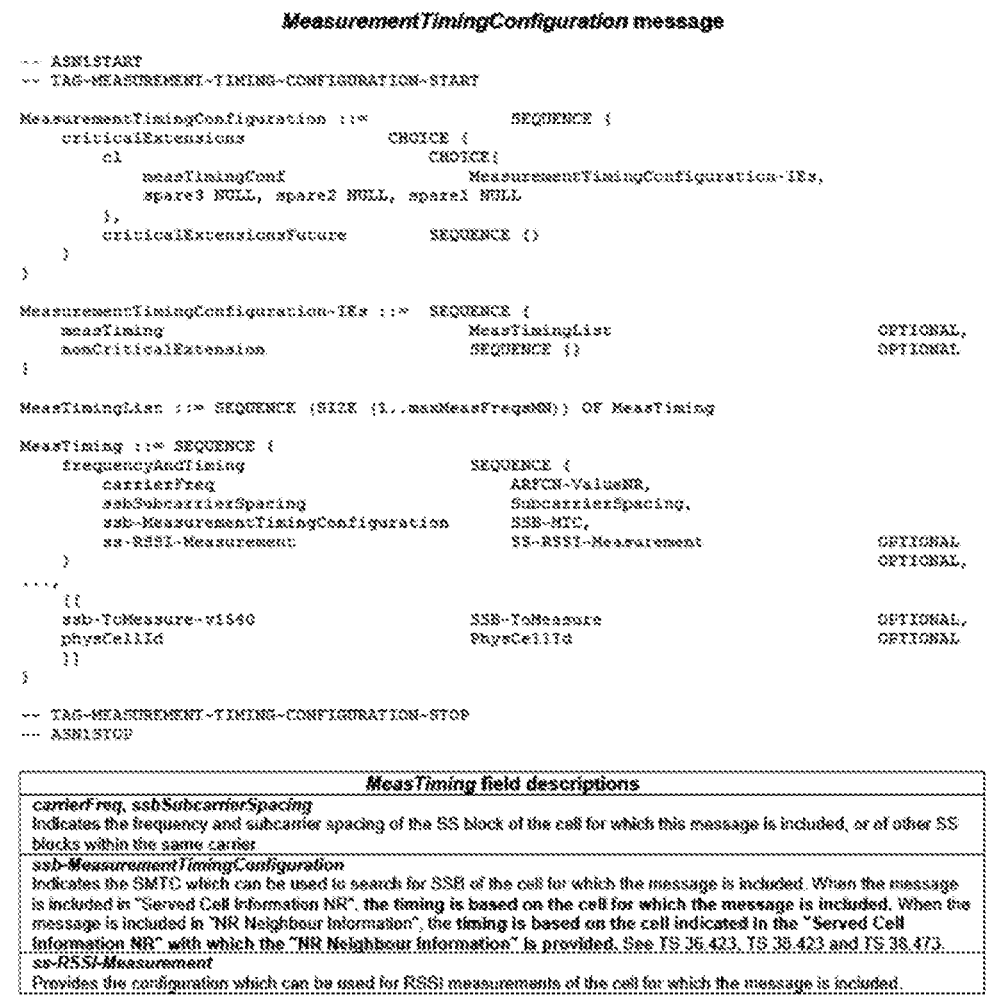

FIG. 8 is a diagram illustrating a Measurement Timing Configuration message as described in 3GPP TS 38.331 v15.4.0;

Figure 11A:
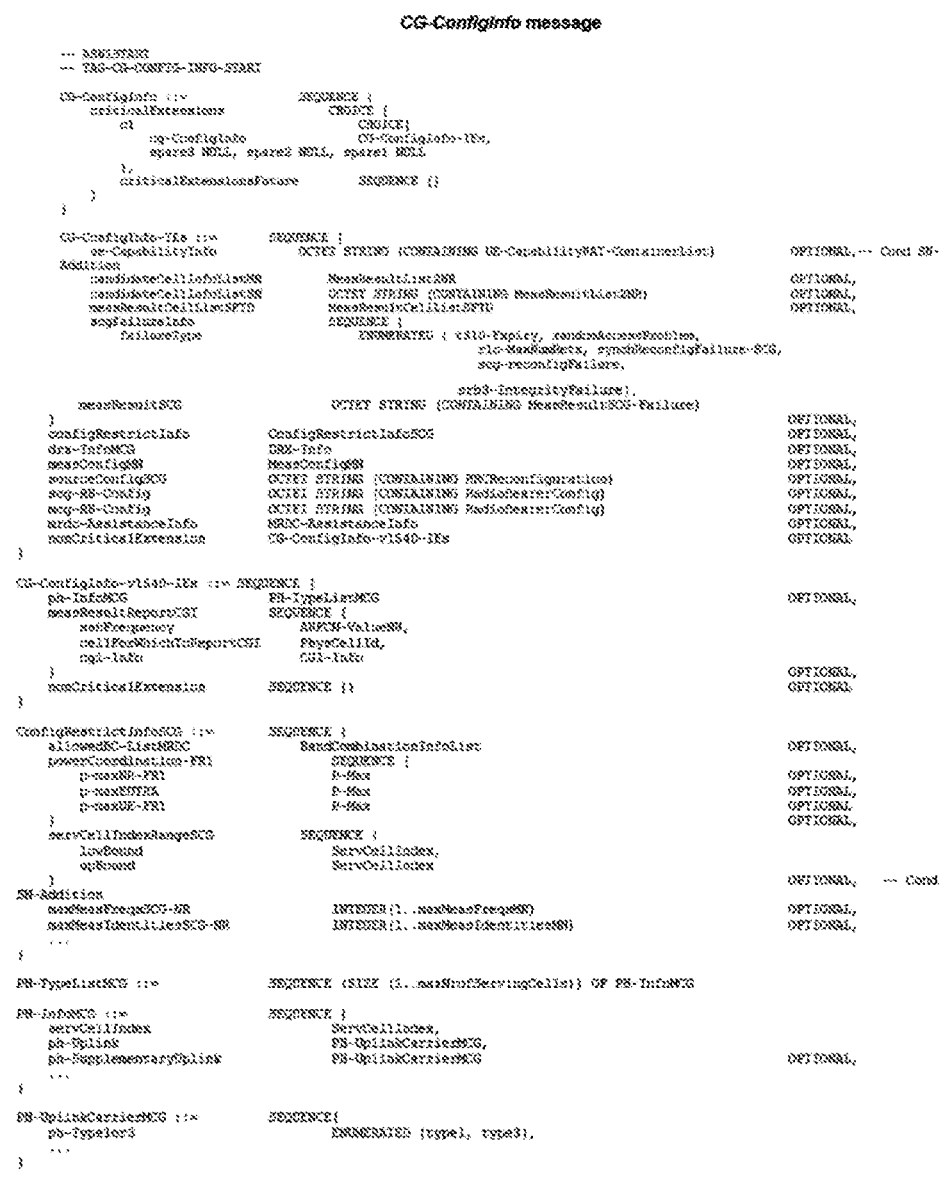
Figure 11B:
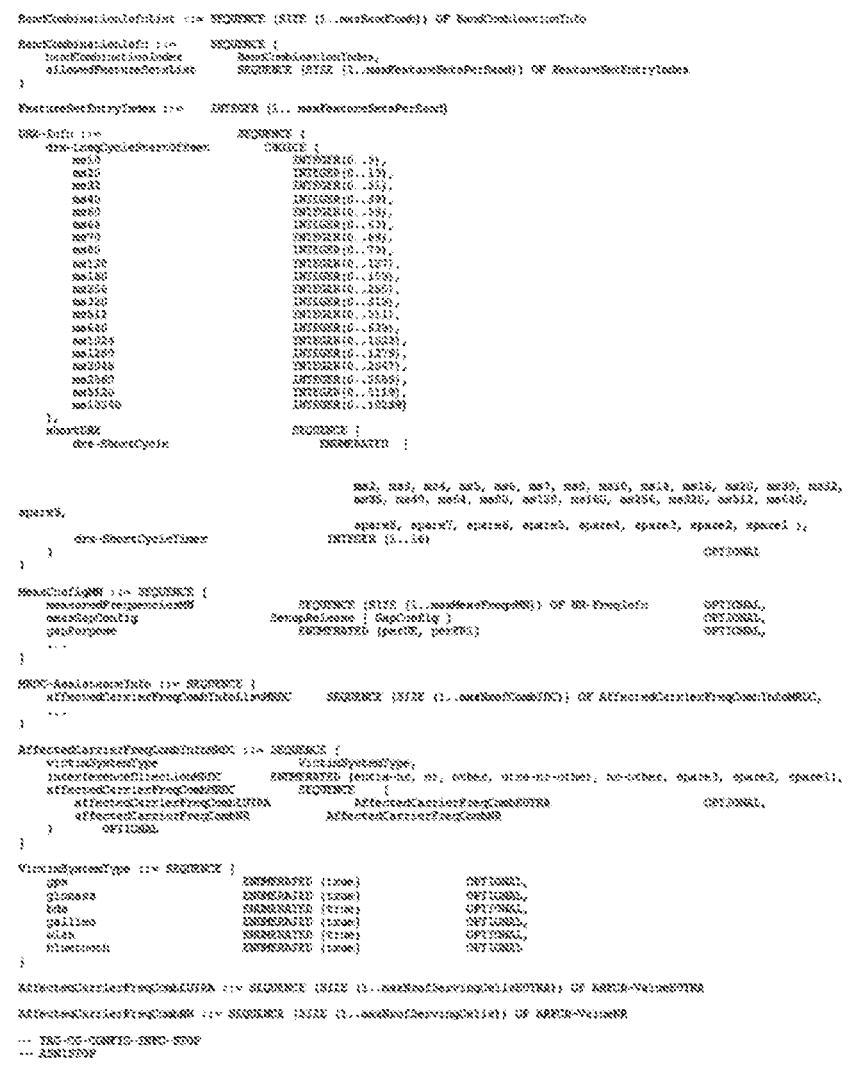

FIGS. 11A-11B are diagrams illustrating a CG-ConfigInfo message as described in 3GPP TS 38.331 v15.4.0;

FIG. 12 is a diagram illustrating a MeasGapConfig information element as described in 3GPP TS 38.331 v15.4.0;

FIG. 13 is a diagram illustrating Gap Pattern Configurations supported by a UE as described in 3GPP TS 36.133 v15.4.0, Table 8.1.2.1-1 (2018-12);

FIGS. 15A-15B is a diagram illustrating served cell information operations/information elements in a wireless communication network according to some embodiments of inventive concepts;

FIG. 18 is a diagram illustrating F1 setup request operations/information elements in a wireless communication network according to some embodiments of inventive concepts;

FIGS. 19A-19B is a diagram illustrating gNB-DU configuration update operations/information elements in a wireless communication network according to some embodiments of inventive concepts;

FIG. 20 is a diagram illustrating served NR cell information operations/information elements in a wireless communication network according to some embodiments of inventive concepts;

FIG. 21 is a diagram illustrating NR neighbour information operations/information elements in a wireless communication network according to some embodiments of inventive concepts;

FIGS. 24A-24C is a diagram illustrating served cell information operations/information elements in a wireless communication network according to some embodiments of inventive concepts;

DETAILED DESCRIPTION

Some of the embodiments contemplated herein will now be described more fully with reference to the accompanying drawings. Other embodiments, however, are contained within the scope of the subject matter disclosed herein, and the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 14:
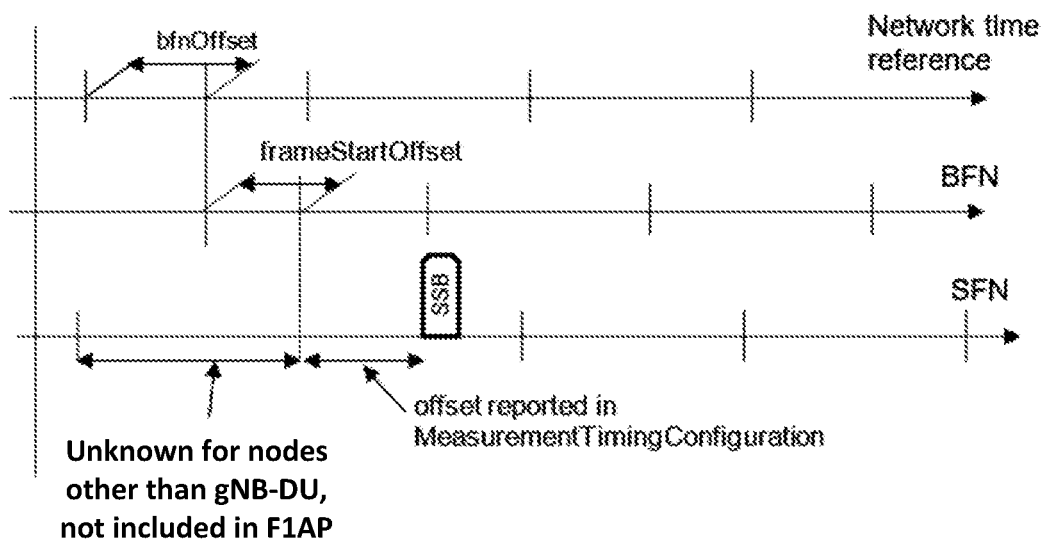
FIG. 14 is a diagram illustrating network time reference, BFN, SFN, SSB, timings and offsets.

FIG. 14 is a diagram illustrating network time reference, Node B Frame Number Counter (BFN), SFN, SSB, timings and offsets. In current messages, a gNB-CU or neighbouring eNB or gNBs are only informed of the offset between the cell SFN and the SSB in the periodicityAndOffset information element (IE) as part of the MeasurementTimingConfiguration of the cell.

The offset between the SFN and the BFN of the node, or the offset between the BFN and an absolute time reference are not known.

Thus, the neighboring nodes may have a reference to a relative time reference (per cell), but they may not know the offset between the relative time and the absolute time reference.

In that case, every node may have to request UE to perform a measurement on each neighboring frequency for a first time until the time difference is found. If a measurement gap is required, the node may have to guess the offset, configure the UE to perform measurements, and repeat with a different offset in case the UE fails to find the SSB.

Additionally, the cell relations configuration in a gNB-CU or eNB may be difficult to manage if all the timing configurations refer to the relative SFN of each cell, as multiple cells in multiple frequencies will share the same configuration. For example, NRCellCU=1 (with the SFN aligned with Global Positioning System (GPS)) and NRCellCU=2 (with SFN 2 ms ahead of GPS) may want to have a frequency relation to a certain SSB frequency and timing configuration.

If an operator were to configure this relation:
It may require the operator to configure an offset per NRCellCU, which may interfere with the lifecycle of F1

The configuration may have to be duplicated per cell offset, which may be added complexity for no gain. Implementation may not be efficient due to complexity or memory.

It may be ambiguous per frequency layer, relying on self-organizing network (SON) features to solve the duality.

It may have to refer to the absolute time in the gNB-CU, if available, and as long as the nodes have a network sync.

In the case of a cg-ConfigInfo RRC, there may be a similar issue. A gNB may not have a reference for the LTE Cell SFN unless System Frame Number and Frame Timing Difference (SFTD) measurements have been performed and the gNB is informed of the result.

Such information is not available in the X2 EN-DC Setup procedure for eNBs.

In the case of shortMeasurementGaps between two LTE frequencies, a eNB must be aware of the neighboring cell SFN offset and duplexing type (TDD/FDD), so it can schedule the gap so it overlaps with the synchronization signal occasion.

Such SFN offset information is not available in X2 Setup procedure.

Certain aspects of the present disclosure and their embodiments may provide solutions to these and/or other challenges. According to certain embodiments, the time difference between the absolute time reference in the node, if present, and the SFN for the cell may be provided.

Certain embodiments may provide one or more of the following technical advantages. Some embodiments may allow for there to be no need to implement logic on the nodes to guess the ssbOffset error, or SFTD measurements (which measure SFN offset between LTE and NR Cell) if there is a Network Synchronization available. Some embodiments may also provide for UEs to be configured with measurement(s) containing the right timing from the start, with no need for a training period for the network. Some embodiments may also provide for the configuration of a radio base station (RBS) to refer to the absolute time. This is relevant for the frequency relations. There may be a time reference for the target cell SSB configuration, and the time reference can be referred then to the absolute time, if present. Some embodiments may also provide for two eNBs with different SFN offsets in their cells to use short measurement gaps without the need for additional configuration. Other technical advantages may also be provided, and certain embodiments may provide some, none, or all of the advantages listed above.

According to certain embodiments, the time difference between the absolute time reference in the node, if present, and the SFN for the cell may be provided. In the various embodiments, other nodes with an absolute time reference can understand the absolute time referred in the MeasurementTimingConfiguration in F1/X2 messages, without needing to implement functionality to guess the offset between them if they have an absolute time reference.

In various embodiments, for F1AP/X2AP/XnAP interfaces, the time difference between the absolute time reference in the node, if present, and the SFN for the cell may be implemented with proprietary and/or standardized messages.

In the case of using standardized messages, the time difference between the absolute time reference in the node, if present, and the SFN for the cell may be implemented in various messages as described further below.

In one embodiment, referring to FIGS. 15a-15B, a served cell Information message may include a SFN offset information element (IE). The SFN offset IE may be implemented over an F1AP interface. The SFN offset IE may be optional, as indicated by "Presence" "O." The SFN offset IE may provide a SFN offset for the cell relative to a network time reference.

Figure 16:
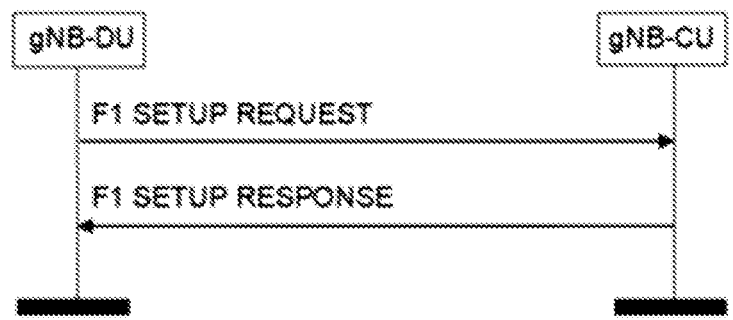
FIG. 16 is a diagram illustrating a F1 setup procedure from 3GPP TS 38.473 in which operations/information elements may be implemented according to some embodiments of inventive concepts.
Figure 17:
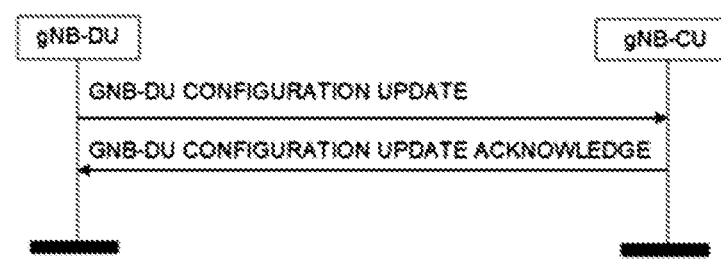
FIG. 17 is a diagram illustrating a gNB-DU configuration update procedure from 3GPP TS 38.473 in which operations/information elements may be implemented according to some embodiments of inventive concepts.

Alternatively, in some embodiments, the SFN offset IE may be implemented as part of the messages sent in a F1 Setup Request and/or a F1 Configuration Update as shown in FIGS. 16 and 17, respectively.

In one embodiment, FIG. 16 illustrates a F1 setup procedure from 3GPP TS 38.473 in which a SFN offset IE may be implemented as part of a F1 Setup Request message sent from a gNB-DU (e.g., gNB-DU 102a) to a gNB-CU (e.g., gNB-CU 102b). This message may be sent by the gNB-DU to transfer information for a TNL association. FIG. 18 illustrates IE/Group Names in a F1 Setup Request message, including the SFN offset IE. Referring to FIG. 18, the SFN offset IE may be optional, as indicated by "Presence" "O." The SFN offset IE may provide a SFN offset for the cell relative to a network time reference.

In another embodiment, FIG. 17 illustrates a gNB-DU configuration update procedure from 3GPP TS 38.473 in which a SFN offset IE may be implemented as part of the F1 Configuration Update message sent from a gNB-Du to a gNB-CU. This message may be sent by the gNB-DU to transfer information for a TNL association. FIG. 19A illustrates IE/Group Names in a gNB-DU Configuration Update message for a new cell, including the SFN offset IE. Referring to FIG. 19A, the SFN offset IE may be optional, as indicated by "Presence" "O." The SFN offset IE may provide a SFN offset for the cell relative to a network time reference. FIG. 19B illustrates IE/Group Names in a gNB-DU Configuration Update message for modifying an existing cell, including the SFN offset IE. Referring to FIG. 19B, the SFN offset IE may be optional, as indicated by "Presence" "O." The SFN offset IE may provide a SFN offset for the cell relative to a network time reference.

In a further embodiment, the SFN offset IE may be implemented as part of a Served NR Cell Information message over an X2AP interface. This message may contain cell configuration information of an NR cell that a neighbour eNB may need for the X2AP interface. FIG. 20 illustrates IE/Group Names in a Served NR Cell Information message, including the SFN offset IE. Referring to FIG. 20, the SFN offset IE may be optional, as indicated by "Presence" "O." The SFN offset IE may provide a SFN offset for the cell relative to a network time reference.

In another embodiment, the SFN offset IE may be implemented as part of a NR Neighbour Information message over an X2AP interface. This message may contain cell configuration information of NR cells that a neighbour node may need for the X2 AP interface. FIG. 21 illustrates IE/Group Names in a NR Neighbour Information message, including the SFN offset IE. Referring to FIG. 21, the SFN offset IE may be optional, as indicated by "Presence" "O." The SFN offset IE may provide a SFN offset for the cell relative to a network time reference.

Figure 22:
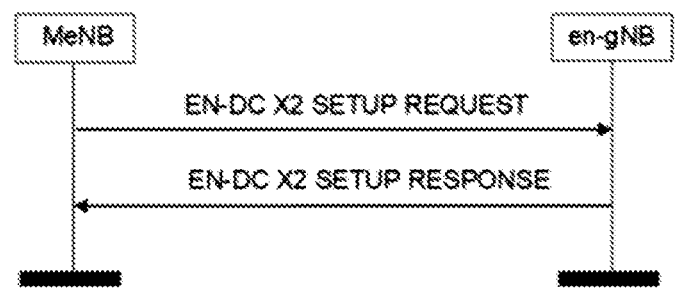
FIG. 22 is a diagram illustrating a EN-DC X2 setup from 3GPP TS 36.423 in which NR neighbour information operations/information elements may be implemented according to some embodiments of inventive concepts.

In another embodiment, FIG. 22 illustrates an EN-DC X2 setup from 3GPP TS 36.423 in which the SFN offset IE may be implemented as part of an EN-DC X2 Setup Request message sent from a MeNB to an en-gNB, per served cell and neighbour information. The SFN offset IE may be optional. The SFN offset IE may provide a SFN offset for the cell relative to a network time reference.

Figure 23:
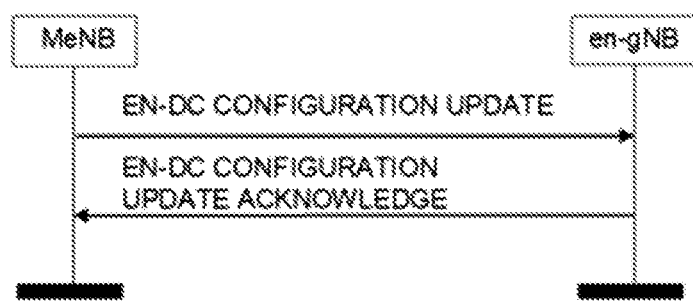
FIG. 23 is a diagram illustrating a EN-DC X2 configuration update from 3GPP TS 36.423 in which NR neighbour information operations/information elements may be implemented according to some embodiments of inventive concepts.

In a further embodiment, FIG. 23 illustrates an eNB initiated EN-DC Configuration Update from 3GPP TS 36.423 in which the SFN offset IE may be implemented as part of an EN-DC Configuration Update message sent from a MeNB to an en-gNB, per served cell and neighbour information. The SFN offset IE may be optional. The SFN offset IE may provide a SFN offset for the cell relative to a network time reference.

In one embodiment, the SFN offset IE may be implemented as part of a Served NR Cell Information message over an XnAP interface. This message may contain cell configuration information of an NR cell that a neighbour eNB may need for the XnAP interface. The Served NR Cell Information message may include the SFN offset IE. The SFN offset IE may be optional. The SFN offset IE may provide a SFN offset for the cell relative to a network time reference.

In another embodiment, the SFN offset IE may be implemented as part of a NR Neighbour Information message over an XnAP interface. This message may contain cell configuration information of NR cells that a neighbour node may need for the XnAP interface. The NR Neighbour Information message may include the SFN offset IE. The SFN offset IE may be optional. The SFN offset IE may provide a SFN offset for the cell relative to a network time reference.

In a further embodiment, the SFN offset IE may be implemented as part of an EN-DC Xn Setup Request message sent from a MeNB to an en-gNB, per served cell and neighbour information. The SFN offset IE may be optional. The SFN offset IE may provide a SFN offset for the cell relative to a network time reference.

In another embodiment, the SFN offset IE may be implemented as part of an EN-DC Configuration Update message over an XnAP interface sent from a MeNB to an en-gNB, per served cell and neighbour information. The SFN offset IE may be optional. The SFN offset IE may provide a SFN offset for the cell relative to a network time reference.

In another embodiment, for eNBs, the SFN offset IE may be added to the Served Cell Information IE described in 3GPP TS 36.423 v 15.4.0 (2018-12), X2 Application Protocol (X2AP). The Served Cell Information IE may contain cell configuration information of a cell that a neighbour eNB may need for the X2 AP interface. FIGS. 24A-24C illustrates IE/Group Names in a Served Cell Information IE, including the SFN offset IE. Referring to FIG. 24C, the SFN offset IE may be optional, as indicated by "Presence" "O." The SFN offset IE may provide a SFN offset for the cell relative to a network time reference. The same SFN offset IE may be added to the neighbour information.

It will be appreciated that the SFN offset IE shown in FIGS. 15, 18-21, and 24A-24C is for purposes of example, and other embodiments may modify the message for configuring the time difference without deviating from the scope of inventive concepts.

Network nodes 102, 104, and 106 include various components described in more detail below. These components work together in order to provide network node and/or wireless device functionality, such as providing wireless connections in a radio access network. In different embodiments, the radio access network may include any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a UE, wireless device and/or with other network nodes or equipment in the radio access network to enable and/or provide wireless access to the wireless device and/or to perform other functions (e.g., administration) in the radio access network. Examples of network nodes include, but are not limited to, Node Bs, evolved Node Bs (eNBs), and next generation Node Bs (gNBs), access points (APs) (e.g., radio access points), base stations (BSs) (e.g., radio base stations), etc.). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node. More generally, however, network nodes may represent any suitable device (or group of devices) capable, configured, arranged, and/or operable to enable and/or provide a wireless device with access to the radio access network or to provide some service to a wireless device that has accessed the radio access network.

Operations of network node 102, 104, 106 (e.g., a base station, eNB, gNB, etc.) of a radio access network will now be discussed with reference to the flow charts of FIGS. 25 and 26. For example, network node 102, 104, 106 may be implemented using the structure of network node 2700 from FIG. 27. Network node 2700 includes a processor circuit 2710 (also referred to as a processor), a memory circuit 2720 (also referred to as memory), and a network interface 2750 (e.g., wired network interface and/or wireless network interface) configured to communicate with other network nodes. The network node 2700 may be configured as a radio network node containing a RF front end with one or more power amplifiers 2730 that transmit and receive through antennas of an antenna array 2740. The memory 2720 stores computer readable program code that when executed by the processor 2710 causes the processor 2710 to perform operations according to embodiments disclosed herein.

Figure 25:
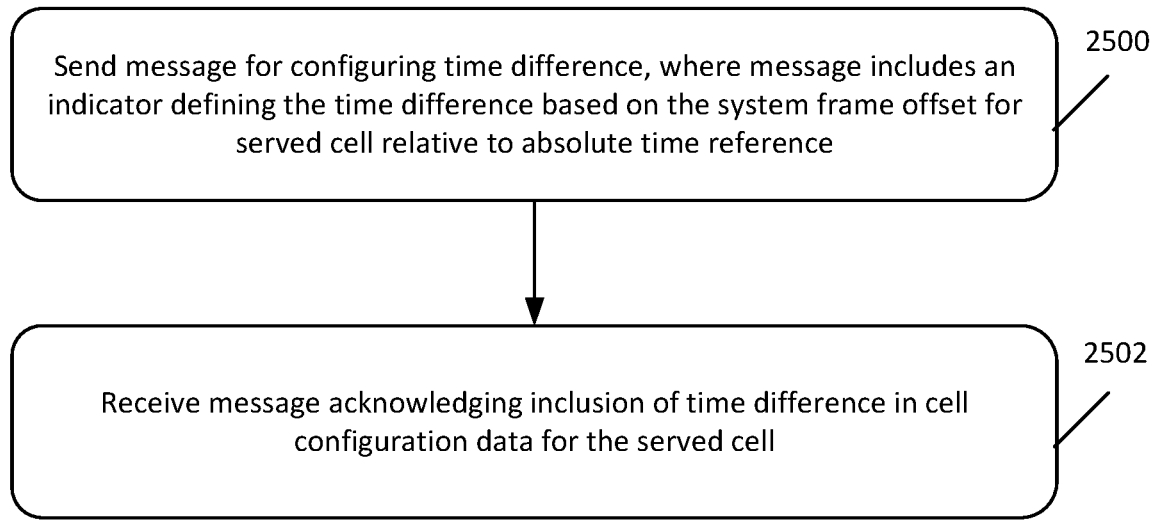
FIG. 25 is a flowchart illustrating operations of a network node according to some embodiments of inventive concepts.

Referring initially to FIG. 25, operations can be performed by a network node (e.g., 102 in FIG. 1) for configuring a time difference in the network node between an absolute time reference in the network node and system frame offset for a served cell of the network node in the radio access network. The operations include sending 2500 a message from a first portion of the network node (e.g., 102b) to a second portion of the network node (e.g., 102a) for configuring the time difference. The message may include an indicator in the message defining the time difference between the system frame offset for the served cell and the absolute time reference. The operations further include receiving 2502 an acknowledgement message from the second portion of the network node acknowledging that the second portion of the network node included the time difference in cell configuration data for the served cell.

In at least some embodiments, the system frame offset for the served cell relative to the absolute time reference is a specified amount of time.

The operation of sending 2500 the message and receiving 2502 the acknowledgement message may be communicated over an F1 application protocol interface.

The first portion of the network node (e.g., 102b) may be a distributed unit of the network node. The second portion of the network node (e.g., 102a) may be a central unit of the network node. The message may include a message requesting an F1 setup with a central unit of the network node. The acknowledgement message may include an F1 setup response message from the central unit of the network node.

In another embodiment, the message may include a message sending a configuration update for a distributed unit of the network node. The acknowledgement message may include a configuration update acknowledgement message from the central unit of the network node.

In a further embodiment, the message may include a message to transfer a transport network layer association to a central unit of the network node. The acknowledgement message may include a transport layer association acknowledgement message from the central unit of the network node.

In another embodiment, the message may include a message to transfer updated information for a transport layer association to a central unit of the network node. The acknowledgement message may include a transport layer association updated acknowledgement message from the central unit of the network node.

Figure 26:
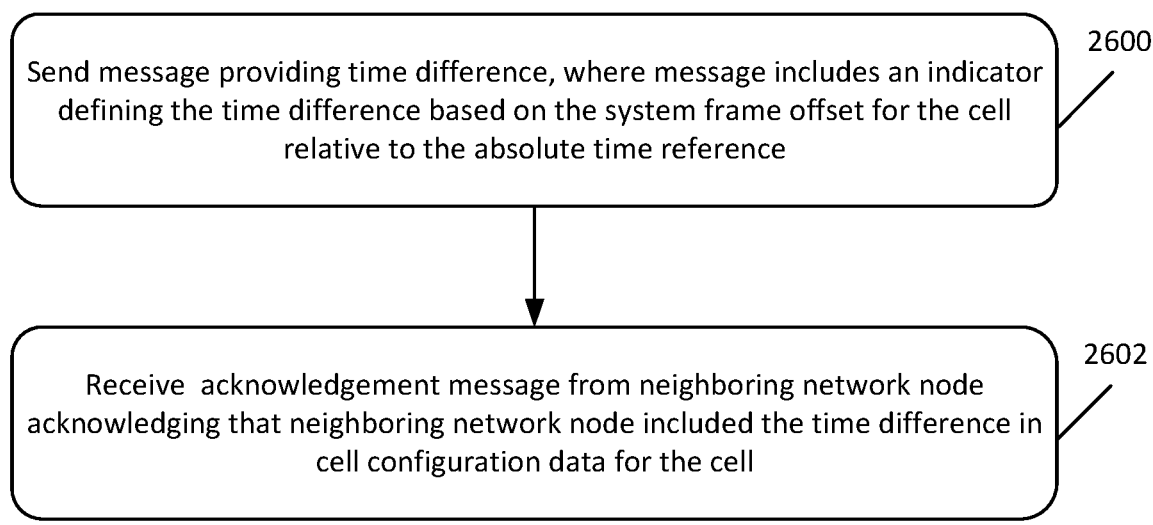
FIG. 26 is a flowchart illustrating operations of a network node according to some embodiments of inventive concepts.

With reference to FIG. 26, operations can be performed by a network node (e.g., 102 in FIG. 1) for providing to a neighboring network node (e.g., 104 in FIG. 1) in a radio access network a time difference between a network time reference and a system frame offset for a cell in a radio access network. The operations include sending 2600 a message from the network node to the neighboring network node providing the time difference. The message may include an indicator in the message defining the time difference between the system frame offset for the cell and the absolute time reference. The operations further include receiving 2702 an acknowledgement message from the neighboring network node acknowledging that the neighboring network node included the time difference in cell configuration data for the cell.

In at least some embodiments, the system frame offset for the neighboring cell relative to the network time reference is a specified amount of time.

In one embodiment, the operation of sending 2600 the message and receiving 2602 the acknowledgement message may be communicated over an X2 application protocol interface. The message may include a message requesting an X2 setup with the neighboring network node. The acknowledgement message may include an X2 setup response message from the neighboring network node.

In another embodiment, the operation of sending 2600 the message and receiving 2602 the acknowledgement message may be communicated over an Xn application protocol interface. The message may include a message requesting an Xn setup with the neighboring network node. The acknowledgement message may include an Xn setup response message with the neighboring network node.

In a further embodiment, the message may include a message sending a configuration update for the neighboring network node. The acknowledgement message may include a configuration update acknowledgement message from the neighboring network node.

In another embodiment, the message may include a message requesting a evolved universal terrestrial radio access new radio dual connectivity (EN-DC) setup with the neighboring node. The acknowledgement message may include an EN-DC acknowledgement message from the neighboring network node.

In a further embodiment, the message may include a message sending an evolved universal terrestrial radio access new radio dual connectivity (EN-DC) configuration update for the neighboring node. The acknowledgement message may include an EN-DC configuration update acknowledgement message from the neighboring network node.

Figure 1:
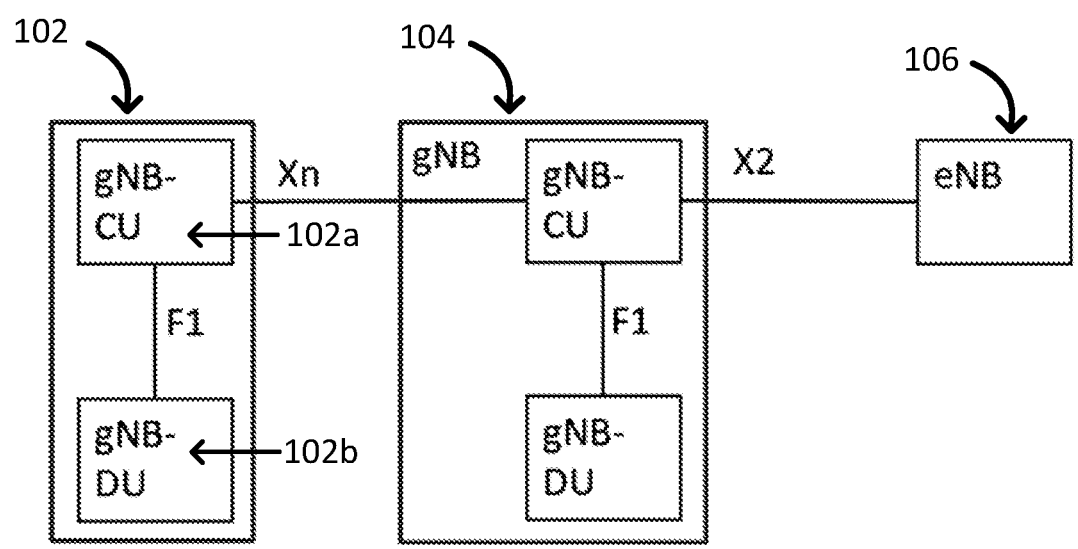
FIG. 1 is a block diagram illustrating a split deployment, where two gNBs are divided into two units with a F1AP interface connecting the divided units in each.
Figure 9:
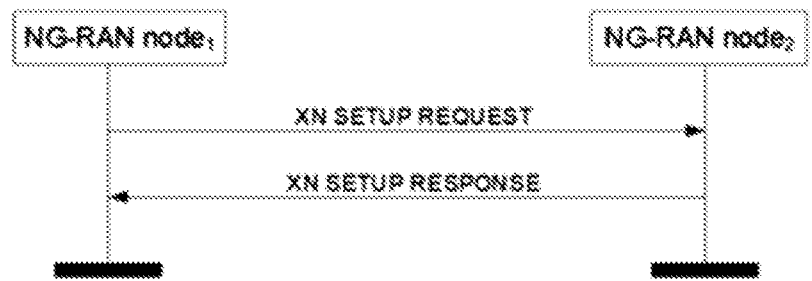
FIG. 9 is a diagram illustrating an Xn Setup, successful operation as described in 3GPP TS 38.423 v15.4.0, Section 8.4.1.2 (2018-12)
Figure 10:
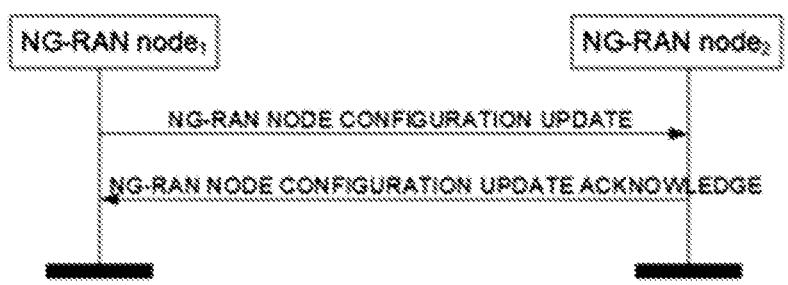
FIG. 10 is a diagram illustrating a NG-RAN node Configuration Update, successful operation as described in 3GPP TS 38.423 v15.4.0, Section 8.4.2.2 (2018-12)

Although the subject matter described herein may be implemented in any appropriate type of system using any suitable components, the embodiments disclosed herein are described in relation to a radio access network that includes example network nodes, such as illustrated in FIG. 1. For simplicity, the network nodes of FIG. 1 depicts only two gNBs 102 and 104, each having a split deployment where the gNB is divided into two units (gNB- CU and gNB-DU), and one eNB 106. In practice, a radio access network may further include any additional elements suitable to support communication between wireless devices or between a wireless device and another communication device, such as a landline telephone, a service provider, or any other network node or end device.

The radio access network may comprise and/or interface with any type of communication, telecommunication, data, cellular, and/or radio network or other similar type of system. In some embodiments, the radio access network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

The radio access network may include one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

In certain embodiments, some or all of the functionality described herein as being provided by a network node, base station, eNB or other such network device may be performed by processing circuitry 2710 executing instructions stored on non-transitory device readable medium 2720 or memory within processing circuitry 2710. In alternative embodiments, some or all of the functionality may be provided by processing circuitry 2710 without executing instructions stored on a separate or discrete device readable medium, such as in a hard-wired manner. In any of those embodiments, whether executing instructions stored on a device readable storage medium or not, processing circuitry 2710 can be configured to perform the described functionality. The benefits provided by such functionality are not limited to processing circuitry 2710 alone or to other components of network node 2700, but are enjoyed by network node 2700 as a whole, and/or by end users and the wireless network generally.

Device readable medium 2720 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 2710. Device readable medium 2720 may store any suitable instructions, data or information, including a computer program, software, an application including one or more of logic, rules, code, tables, etc. and/or other instructions capable of being executed by processing circuitry 2710 and, utilized by network node 2700. Device readable medium 2720 may be used to store any calculations made by processing circuitry 2710 and/or any data received via interface 2750. In some embodiments, processing circuitry 2710 and device readable medium 2720 may be considered to be integrated.

Interface 2750 is used in the wired or wireless communication of signalling and/or data between network node 2700, the radio access network, and/or UEs. Interface 2750 comprises port(s)/terminal(s) to send and receive data, for example to and from the radio access network over a wired connection. Interface 2750 also may include radio front end circuitry 2730 that may be coupled to, or in certain embodiments a part of, antenna 2740. Radio front end circuitry 2730 may include filters and amplifiers. Radio front end circuitry 2730 may be connected to antenna 2740 and processing circuitry 2710. Radio front end circuitry may be configured to condition signals communicated between antenna 2740 and processing circuitry 2710. Radio front end circuitry 2730 may receive digital data that is to be sent out to other network nodes or WDs via a wireless connection. Radio front end circuitry 2730 may convert the digital data into a radio signal having the appropriate channel and bandwidth parameters using a combination of filters and/or amplifiers. The radio signal may then be transmitted via antenna 2740. Similarly, when receiving data, antenna 2740 may collect radio signals which are then converted into digital data by radio front end circuitry 2730. The digital data may be passed to processing circuitry 2710. In other embodiments, the interface may comprise different components and/or different combinations of components.

In certain alternative embodiments, network node 2700 may not include separate radio front end circuitry 2730, instead, processing circuitry 2710 may comprise radio front end circuitry and may be connected to antenna 2740 without separate radio front end circuitry 2730. Similarly, in some embodiments, all or some of RF transceiver circuitry may be considered a part of interface 2750. In still other embodiments, interface 2750 may include one or more ports or terminals 2730, radio front end circuitry 2730, and RF transceiver circuitry, as part of a radio unit (not shown), and interface 2750 may communicate with baseband processing circuitry, which is part of a digital unit (not shown).

Antenna 2740 may include one or more antennas, or antenna arrays, configured to send and/or receive wireless signals. Antenna 2740 may be coupled to radio front end circuitry 2750 and may be any type of antenna capable of transmitting and receiving data and/or signals wirelessly. In some embodiments, antenna 2740 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 2740 may be separate from network node 2700 and may be connectable to network node 2700 through an interface or port.

Antenna 2740, interface 2750, and/or processing circuitry 2710 may be configured to perform any receiving operations and/or certain obtaining operations described herein as being performed by a network node. Any information, data and/or signals may be received from a wireless device, another network node and/or any other network equipment. Similarly, antenna 2740, interface 2750, and/or processing circuitry 2710 may be configured to perform any transmitting operations described herein as being performed by a network node. Any information, data and/or signals may be transmitted to a wireless device, another network node and/or any other network equipment.

Power circuitry (not shown) may comprise, or be coupled to, power management circuitry and is configured to supply the components of network node 2700 with power for performing the functionality described herein. Power circuitry may receive power from power source. Power source and/or power circuitry may be configured to provide power to the various components of network node 2700 in a form suitable for the respective components (e.g., at a voltage and current level needed for each respective component). Power source (not shown) may either be included in, or external to, power circuitry and/or network node 2700. For example, network node 2700 may be connectable to an external power source (e.g., an electricity outlet) via an input circuitry or interface such as an electrical cable, whereby the external power source supplies power to power circuitry. As a further example, power source 486 may comprise a source of power in the form of a battery or battery pack which is connected to, or integrated in, power circuitry. The battery may provide backup power should the external power source fail. Other types of power sources, such as photovoltaic devices, may also be used.

Figure 27:
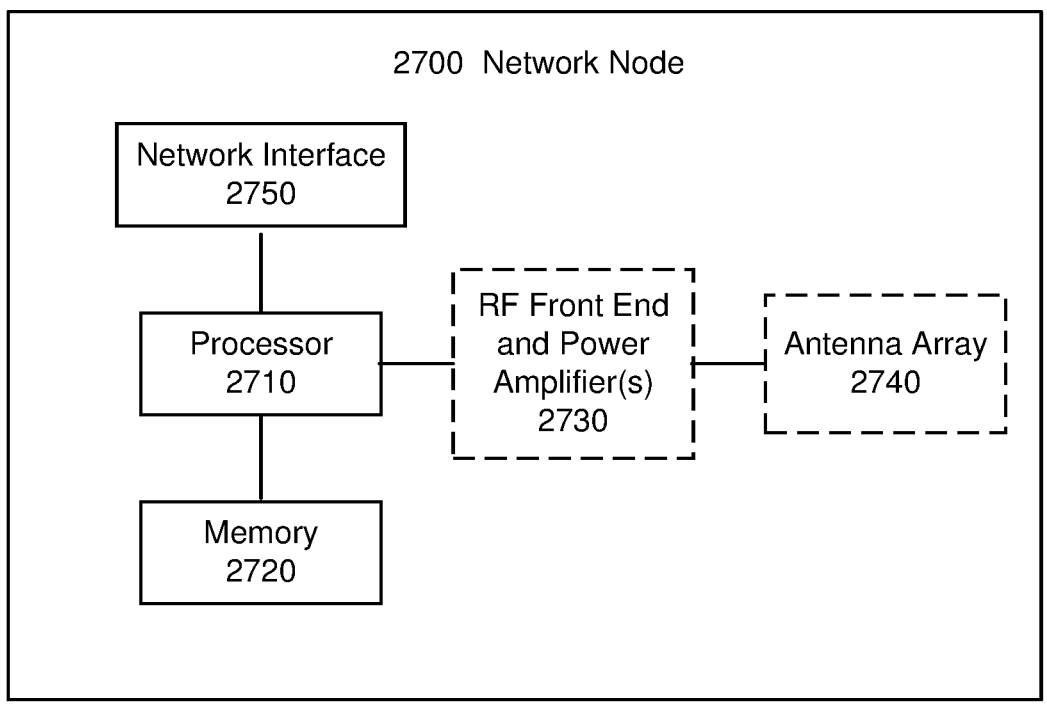
FIG. 27 is a block diagram illustrating a network node according to some embodiments of inventive concepts

Alternative embodiments of network node 2700 may include additional components beyond those shown in FIG. 27 that may be responsible for providing certain aspects of the network node's functionality, including any of the functionality described herein and/or any functionality useful/ necessary to support the subject matter described herein. For example, network node 2700 may include user interface equipment to allow input of information into network node 2700 and to allow output of information from network node 2700. This may allow a user to perform diagnostic, maintenance, repair, and other administrative functions for network node 2700.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

The invention claimed is:

1. A method performed by a network node in a radio access network, the method comprising:
   sending a message from a first portion of the network node to a second portion of the network node for configuring a time difference, the message including an indicator in the message defining the time difference in the network node between an absolute time reference in the network node and a system frame offset for a served cell of the network node; and
   receiving an acknowledgement message from the second portion of the network node acknowledging that the second portion of the network node included the time difference in cell configuration data for the served cell.

2. The method of claim 1, wherein the system frame offset for the served cell relative to the absolute time reference is a specified amount of time.

3. The method of claim 1, wherein sending the message and receiving the acknowledgement message are communicated over an F1 application protocol interface.

4. The method of claim 1, wherein the first portion of the network node is a distributed unit of the network node; and wherein the second portion of the network node is a central unit of the network node.

5. The method of claim 4, wherein the message comprises a message requesting an F1 setup with the central unit of the network node, and wherein the receiving the acknowledgement message comprises a F1 setup response message from the central unit of the network node.

6. The method of claim 4, wherein the message comprises a message sending a configuration update for the distributed unit of the network node, and wherein the receiving the acknowledgement message comprises receiving a configuration update acknowledgement message from the central unit of the network node.

7. The message of claim 4, wherein the message comprises a message to transfer a transport network layer association to the central unit of the network node, and wherein the receiving the acknowledgement message comprises receiving a transport layer association acknowledgement message from the central unit of the network node.

8. The method of claim 4, wherein the message comprises a message to transfer updated information for a transport layer association to the central unit of the network node, and wherein the receiving the acknowledgement message comprises a transport layer association updated acknowledgement message from the central unit of the network node.

9. A method performed by a network node in a radio access network, the method comprising:
   sending a message from the network node to the neighboring network node providing a time difference between a network time reference and a system frame offset for a cell in a radio access network, the message including an indicator in the message defining the time difference between the system frame offset for the cell and the absolute time reference; and
   receiving an acknowledgement message from the neighboring network node acknowledging that the neighboring network node included the time difference in cell configuration data for the cell.

10. The method of claim 9, wherein the system frame offset for the neighboring cell relative to the network time reference is a specified amount of time.

11. The method of claim 9, wherein sending the message and receiving the acknowledgement message are communicated over an X2 application protocol interface.

12. The method of claim 9, wherein the message comprises a message requesting an X2 setup with the neighboring network node.

13. The method of claim 9, wherein the acknowledgement message comprises an X2 setup response message from the neighboring network node.

14. The method of claim 9, wherein sending the message and receiving the acknowledgement message are communicated over an Xn application protocol interface.

15. The method of claim 14, wherein the message comprises a message requesting an Xn setup with the neighboring network node, and wherein the acknowledgement message comprises an Xn setup response message with the neighboring network node.

16. The method of claim 9, wherein the message comprises a message sending a configuration update for the neighboring network node, and wherein the receiving the acknowledgement message comprises a configuration update acknowledgement message from the neighboring network node.

17. The message of claim 9, wherein the message comprises a message requesting a evolved universal terrestrial radio access new radio dual connectivity (EN-DC) setup with the neighboring node, and wherein the receiving the acknowledgement message comprises an EN-DC acknowledgement message from the neighboring network node.

18. The method of claim 9, wherein the message comprises a message sending an evolved universal terrestrial radio access new radio dual connectivity (EN-DC) configuration update for the neighboring node, and wherein the receiving the acknowledgement message comprises an EN-DC configuration update acknowledgement message from the neighboring network node.

19. A network node, the network node comprising:
   a processor; and
   a memory coupled with the processor, wherein the memory includes instructions that when executed by the processor causes the processor to:
      send a message from a first portion of the network node to a second portion of the network node for configuring a time difference in the network node between an absolute time reference in the network node and a system frame offset for a served cell of the network node in a radio access network, the message including an indicator in the message defining the time difference between the system frame offset for the served cell and the absolute time reference; and
      receive an acknowledgement message from the second portion of the network node acknowledging that the second portion of the network node included the time difference in cell configuration data for the served cell.

20. A network node, the network node comprising:
   a processor; and
   a memory coupled with the processor, wherein the memory includes instructions that when executed by the processor causes the processor to:
      send a message from the network node to a neighboring network node providing a time difference between a network time reference and a system frame offset for a cell in a radio access network, the message including an indicator in the message defining the time difference between the system frame offset for the cell and the absolute time reference; and receive an acknowledgement message from the neighboring network node acknowledging that the neighboring network node included the time difference in cell configuration data for the cell.

* * * * *